US009768943B2

United States Patent
Xu et al.

(10) Patent No.: US 9,768,943 B2
(45) Date of Patent: *Sep. 19, 2017

(54) INTERFERENCE MANAGEMENT FOR ADAPTIVE TDD WITH FREQUENCY DOMAIN SEPARATIONS

(71) Applicant: QUALCOMM Incorporated, San Diego, CA (US)

(72) Inventors: Hao Xu, San Diego, CA (US); Wanshi Chen, San Diego, CA (US); Peter Gaal, San Diego, CA (US); Stefan Geirhofer, Brooklyn, NY (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/052,821

(22) Filed: Feb. 24, 2016

(65) Prior Publication Data

US 2016/0173264 A1 Jun. 16, 2016
US 2017/0155493 A9 Jun. 1, 2017

Related U.S. Application Data

(63) Continuation of application No. 13/891,143, filed on May 9, 2013.
(Continued)

(51) Int. Cl.
*H04W 16/14* (2009.01)
*H04W 72/04* (2009.01)
(Continued)

(52) U.S. Cl.
CPC .................. *H04L 5/14* (2013.01); *H01J 1/02* (2013.01); *H04J 1/02* (2013.01); *H04L 5/001* (2013.01);
(Continued)

(58) Field of Classification Search
CPC ..... H04W 72/04; H04W 16/12; H04W 16/14; H04W 72/0453
(Continued)

(56) References Cited

U.S. PATENT DOCUMENTS 6,157,811 A 12/2000 Dent
6,804,216 B1 10/2004 Kuwahara et al.
(Continued)

FOREIGN PATENT DOCUMENTS

CN 102149099 A 8/2011
CN 102291785 A 12/2011
(Continued)

OTHER PUBLICATIONS

Ericsson et al.,"Applicable scenarios for TDD CA of different UL-DL configurations", 3GPP Draft; R1-113532, 3rd Generation Partnership Project (3GPP), Mobile Competence Centre; 650, Route Des Lucioles; F-06921 Sophia-Antipolis Cedex; France,vol. RAN WG1, No. Zhuhai; Oct. 10, 2011, Oct. 14, 2011 (Oct. 14, 2011), XP050538655.
(Continued)

*Primary Examiner* — Edan Orgad
*Assistant Examiner* — Emmanuel Maglo
(74) *Attorney, Agent, or Firm* — Anthony R. Morris

(57) ABSTRACT

A method of wireless communications includes adapting to downlink/uplink resource allocations. In particular, the downlink/uplink communications may be adjusted according to time division duplexed (TDD) configurations of serving and neighbor cells.

8 Claims, 21 Drawing Sheets

Related U.S. Application Data

(60) Provisional application No. 61/646,710, filed on May 14, 2012.

(51) Int. Cl.
| | |
|---|---|
| *H04L 5/14* | (2006.01) |
| *H04L 5/00* | (2006.01) |
| *H04W 72/08* | (2009.01) |
| *H04J 1/02* | (2006.01) |
| *H04W 72/12* | (2009.01) |
| *H01J 1/02* | (2006.01) |

(52) U.S. Cl.
CPC .......... *H04L 5/0073* (2013.01); *H04L 5/0092* (2013.01); *H04L 5/1469* (2013.01); *H04W 72/0446* (2013.01); *H04W 72/082* (2013.01); *H04W 72/1268* (2013.01); *H04W 72/0426* (2013.01)

(58) Field of Classification Search
USPC .......................................................... 370/280
See application file for complete search history.

(56) References Cited

U.S. PATENT DOCUMENTS

| | | | |
|---|---|---|---|
| 6,940,845 B2 | 9/2005 | Benveniste | |
| 7,227,850 B2 | 6/2007 | Dahlman et al. | |
| 7,801,490 B1 | 9/2010 | Scherzer | |
| 7,969,923 B2* | 6/2011 | Sorond | H04B 7/2615 370/310 |
| 8,169,955 B2* | 5/2012 | Ansari | H04B 7/18513 370/208 |
| 8,265,096 B2* | 9/2012 | Zheng | H04L 5/0007 370/473 |
| 8,295,226 B2* | 10/2012 | Fujii | H04W 16/14 370/319 |
| 8,547,989 B2 | 10/2013 | Dayal et al. | |
| 8,553,589 B2* | 10/2013 | Hui | H04B 7/2656 370/279 |
| 2004/0264393 A1 | 12/2004 | Desgagne et al. | |
| 2008/0123520 A1 | 5/2008 | Ji et al. | |
| 2008/0165710 A1 | 7/2008 | Parts et al. | |
| 2010/0220675 A1 | 9/2010 | Chun et al. | |
| 2010/0255851 A1 | 10/2010 | Kwak et al. | |
| 2011/0128909 A1 | 6/2011 | Luo et al. | |
| 2011/0149813 A1 | 6/2011 | Parkvall et al. | |
| 2011/0286370 A1* | 11/2011 | Tang | H04W 72/0446 370/280 |
| 2012/0057545 A1* | 3/2012 | Hariharan | H04L 1/1887 370/329 |
| 2012/0063321 A1 | 3/2012 | Chandrasekhar et al. | |
| 2012/0094681 A1 | 4/2012 | Freda et al. | |
| 2012/0099558 A1* | 4/2012 | Skov | H04W 16/12 370/329 |
| 2012/0113831 A1* | 5/2012 | Pelletier | H04L 5/0058 370/252 |
| 2012/0213095 A1* | 8/2012 | Krishnamurthy | H04L 5/001 370/252 |
| 2012/0219042 A1* | 8/2012 | Onggosanusi | H04B 7/0456 375/219 |
| 2012/0236736 A1 | 9/2012 | Frank et al. | |
| 2012/0243448 A1* | 9/2012 | Pan | H04W 48/16 370/280 |
| 2013/0003664 A1 | 1/2013 | Frenne et al. | |
| 2013/0028128 A1 | 1/2013 | Novak et al. | |
| 2013/0077551 A1 | 3/2013 | Lo et al. | |
| 2013/0094409 A1* | 4/2013 | Li | H04W 48/12 370/280 |
| 2013/0107705 A1* | 5/2013 | Dinan | H04W 72/0446 370/230 |
| 2013/0176981 A1 | 7/2013 | Earnshaw et al. | |
| 2013/0194982 A1 | 8/2013 | Fwu et al. | |
| 2013/0242812 A1 | 9/2013 | Khoryaev et al. | |
| 2013/0242821 A1* | 9/2013 | Wei | H04W 72/04 370/280 |
| 2013/0279376 A1* | 10/2013 | Ahmadi | H04W 16/14 370/277 |
| 2013/0301570 A1 | 11/2013 | Xu et al. | |
| 2013/0303177 A1 | 11/2013 | Chen et al. | |
| 2013/0322308 A1* | 12/2013 | Yu | H04W 16/14 370/280 |
| 2013/0329612 A1 | 12/2013 | Seo et al. | |
| 2013/0343217 A1* | 12/2013 | Pan | H04W 72/082 370/252 |
| 2014/0152459 A1 | 6/2014 | Olson et al. | |
| 2014/0204807 A1 | 7/2014 | Li et al. | |
| 2017/0150496 A1 | 5/2017 | Xu et al. | |

FOREIGN PATENT DOCUMENTS

| | | |
|---|---|---|
| CN | 102387543 A | 3/2012 |
| EP | 2603027 A1 | 6/2013 |
| EP | 2696645 A1 | 2/2014 |
| WO | 2011162656 A1 | 12/2011 |
| WO | 2011162676 A1 | 12/2011 |
| WO | 2012028025 A1 | 3/2012 |

OTHER PUBLICATIONS

International Search Report and Written Opinion—PCT/US2013/040660—ISA/EPO—Jul. 23, 2014.
Partial International Search Report—PCT/US2013/040660—ISAEPO—Mar. 4, 2014.
3GPP : Interference Mitigation in TDD eIMTA [online], 3GPP TSG RAN WG1 Meeting #72bis R1-131352, Research In Motion, UK Limited, Apr. 6, 2013, [retrieved on Apr. 14, 2017], Retrieved from the Internet: URL: http://www.3gpp.org/ftp/tsg_ran?WG1_RL1/TSGR1_72b/Docs/R1-131352.zip, 4 pages.
Intel Corporation: "Interference Environment and DL-UL traffic asymmetry in LTE-TDD systems [online]," 3GPP TSG-RAN WG1 #66 R1-112229, Aug. 16, 2011, [retrieved on Apr. 13, 2017], Retrieved from the Internet: URL: http://www.3gpp.org/ftp/tsg_ran/WG1_RL1/TSGR1_66/Docs/R1-112229.zip , 5 pages.
LG Electronics: "Issues in Further Enhancements to L TE TOO", 3GPP Draft; R1-121461 ETDD Issues, 3rd Generation Partnership Project (3GPP), Mobile Competence Centre ; 650, Route Des Lucioles; F-06921 Sophiaantipolis Cedex ; France, vol. RAN WG1 , No. Jeju, Korea; Mar. 26-Mar. 30, 2012, Mar. 20, 2012 (Mar. 20, 2012), XP050599742, (retrieved on Mar. 20, 2012].

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

INTERFERENCE MANAGEMENT FOR ADAPTIVE TDD WITH FREQUENCY DOMAIN SEPARATIONS

CROSS-REFERENCE TO RELATED APPLICATIONS

This application is a continuation of U.S. patent application Ser. No. 13/891,143, entitled "INTERFERENCE MANAGEMENT FOR ADAPTIVE TDD WITH FREQUENCY DOMAIN SEPARATIONS," filed on May 9, 2013, which claims the benefit under 35 U.S.C. §119(e) to U.S. Provisional Patent Application No. 61/646,170 entitled "INTERFERENCE MANAGEMENT FOR ADAPTIVE TDD WITH FREQUENCY DOMAIN SEPARATIONS," filed on May 11, 2012, the disclosures of which are expressly incorporated by reference herein in their entireties

BACKGROUND

Field

Aspects of the present disclosure relate generally to wireless communication systems, and more particularly to interference management in adaptive time division duplexed (TDD) systems with frequency domain separations.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect, a method of wireless communication is disclosed. The method includes identifying a potential interference condition based at least in part on an uplink/downlink configuration mismatch. Also included is signaling, to a neighbor base station, to restrict frequency resources based on the identified potential interference.

Another aspect discloses a method of wireless communication and includes adaptively assigning an uplink or downlink transmission direction for component carriers.

Another aspect discloses a method of wireless communication and includes frequency division multiplexing uplink and downlink transmissions within a component carrier.

In another aspect, a wireless communication having a memory and at least one processor coupled to the memory is disclosed. The processor(s) is configured to identify a potential interference condition based at least in part on an uplink/downlink configuration mismatch. The processor(s) is also configured to signal, to a neighbor base station, to restrict frequency resources based on the identified potential interference.

Another aspect discloses a method of a wireless communication having a memory and at least one processor coupled to the memory. The processor(s) is configured to adaptively assign an uplink or downlink transmission direction for component carriers.

Another aspect discloses a method of a wireless communication having a memory and at least one processor coupled to the memory. The processor(s) is configured to frequency division multiplex uplink and downlink transmissions within a component carrier.

In another aspect, a computer program product for wireless communications in a wireless network having a non-transitory computer-readable medium is disclosed. The computer-readable medium has non-transitory program code recorded thereon which, when executed by the processor(s), causes the processor(s) to perform operations of identifying a potential interference condition based at least in part on an uplink/downlink configuration mismatch. The program code also causes the processor(s) to signal, to a neighbor base station, to restrict frequency resources based on the identified potential interference.

Another aspect discloses a computer program product for wireless communications in a wireless network having a non-transitory computer-readable medium. The computer-readable medium has non-transitory program code recorded thereon which, when executed by the processor(s), causes the processor(s) to perform the operation of adaptively assigning an uplink or downlink transmission direction for component carriers.

Another aspect discloses a computer program product for wireless communications in a wireless network having a non-transitory computer-readable medium. The computer-readable medium has non-transitory program code recorded thereon which, when executed by the processor(s), causes the processor(s) to perform the operation of frequency division multiplexing uplink and downlink transmissions within a component carrier.

In another aspect, an apparatus for wireless communication is disclosed and includes means for identifying a potential interference condition based at least in part on an uplink/downlink configuration mismatch. Also included is means for signaling, to a neighbor base station, to restrict frequency resources based on the identified potential interference.

Another aspect discloses an apparatus for wireless communication and includes means for adaptively assigning an uplink or downlink transmission direction for component carriers.

Another aspect discloses an apparatus for wireless communication and includes means for frequency division multiplexing uplink and downlink transmissions within a component carrier.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 7 is a diagram illustrating uplink-downlink subframe configurations in LTE.

DETAILED DESCRIPTION

Figure 1:
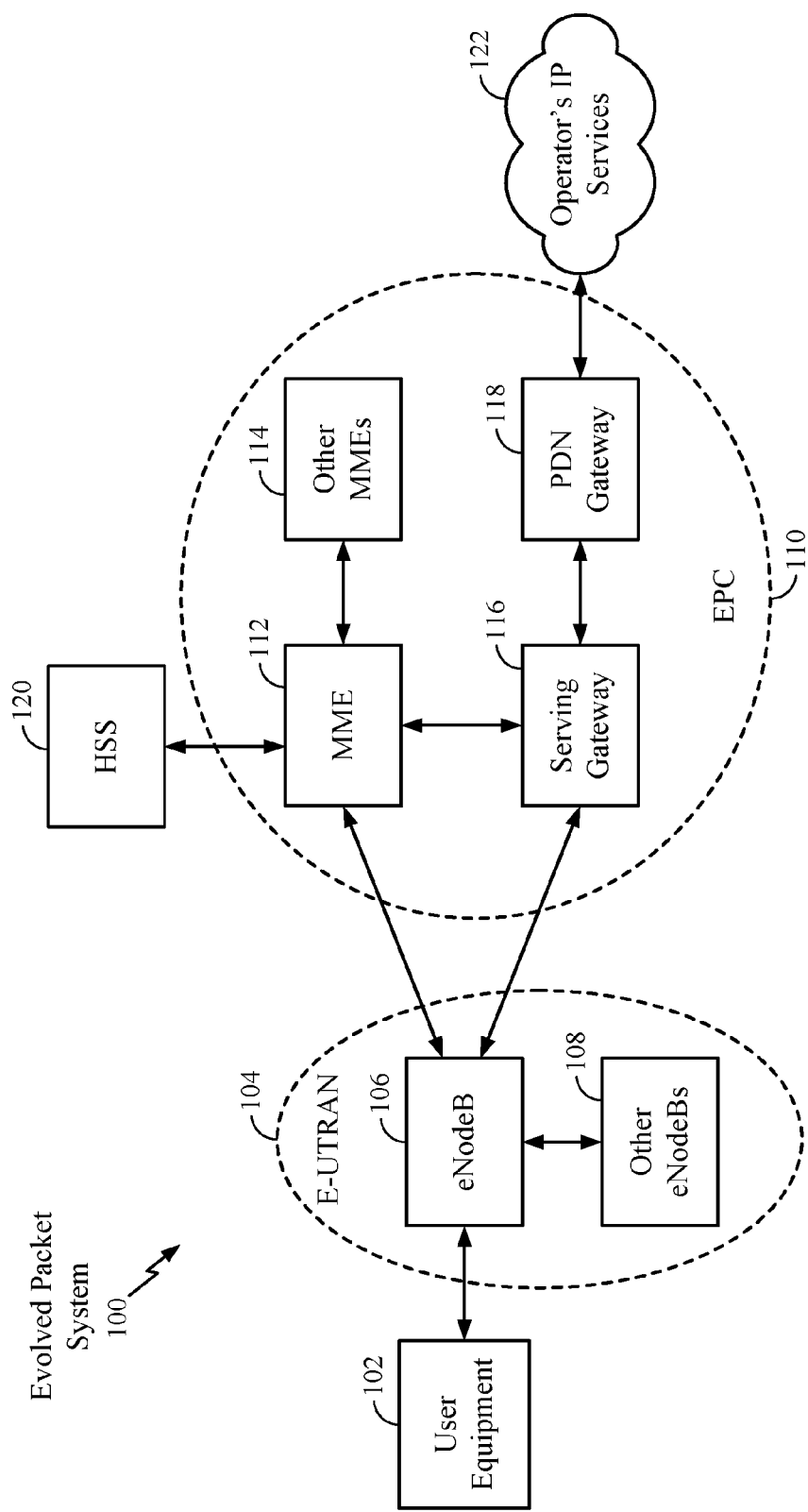
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via an X2 interface (e.g., backhaul). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
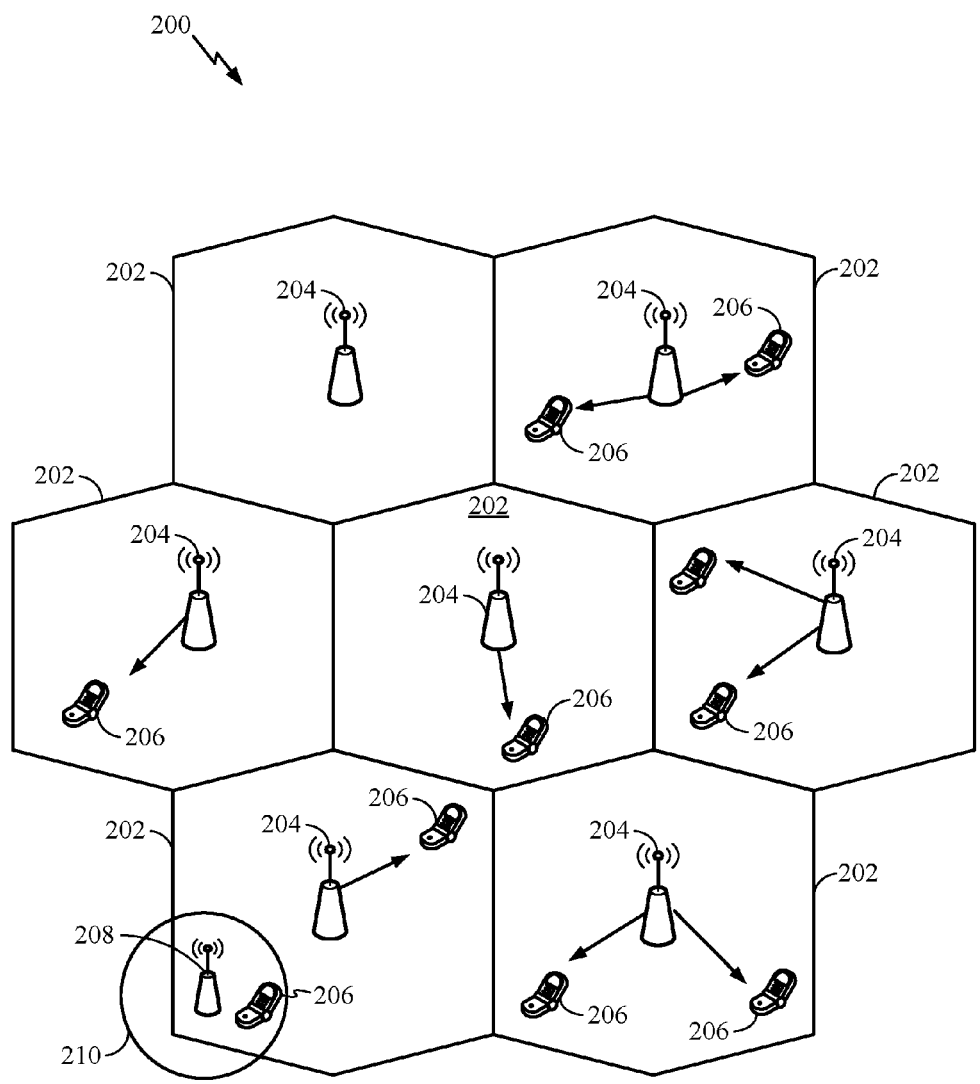
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be referred to as a remote radio head (RRH). The lower power class eNodeB 208 may be a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
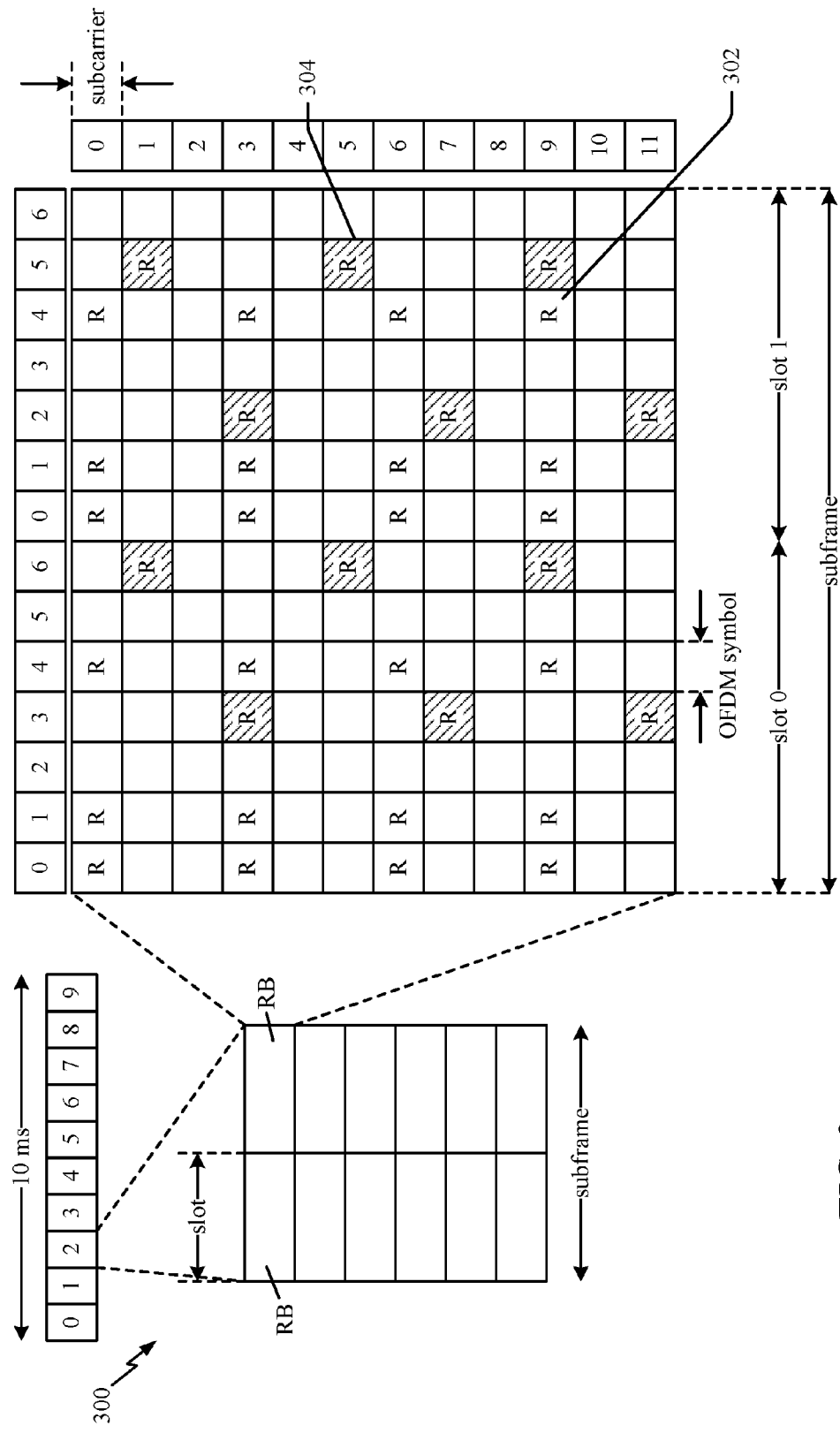
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
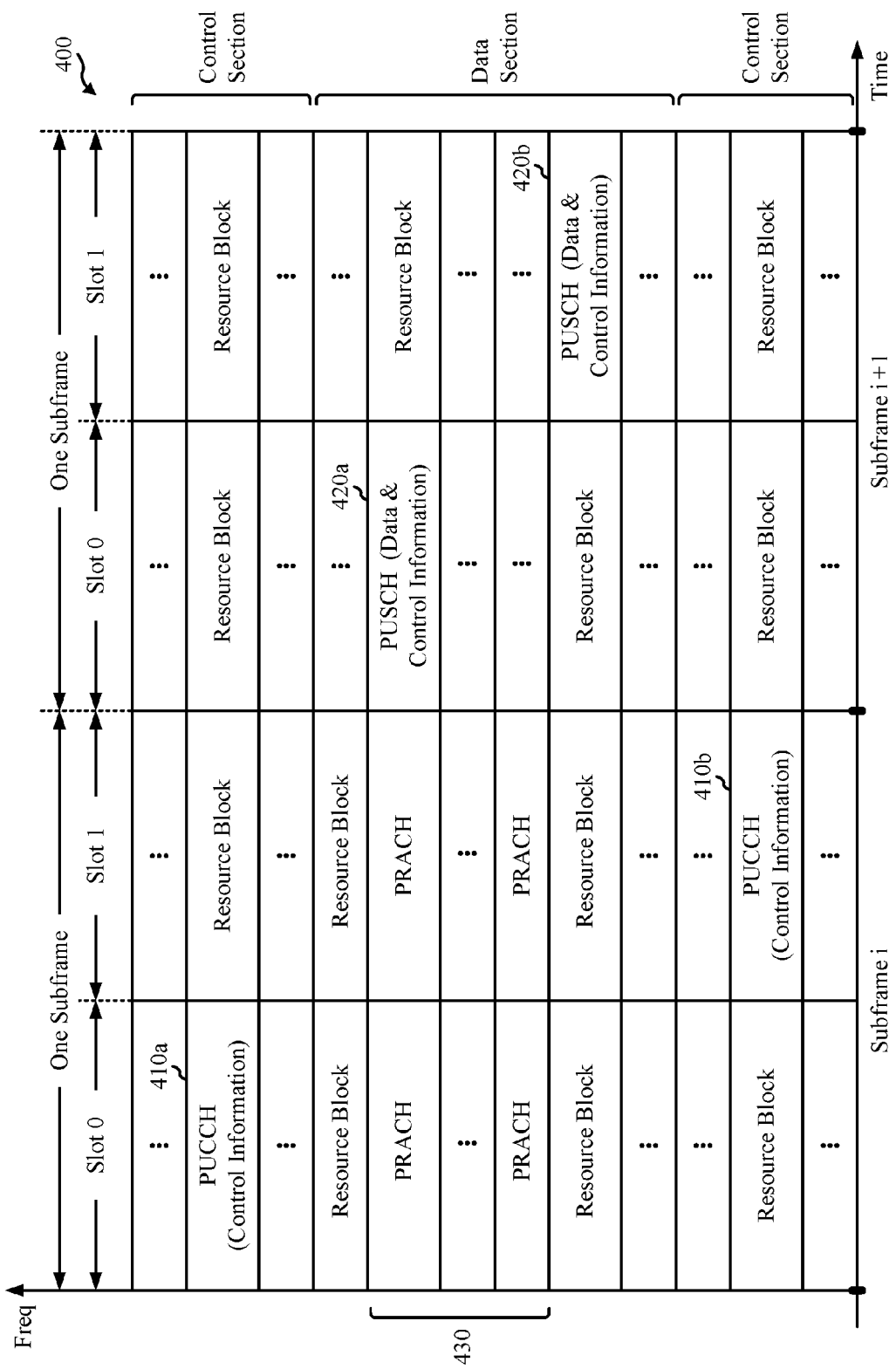
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
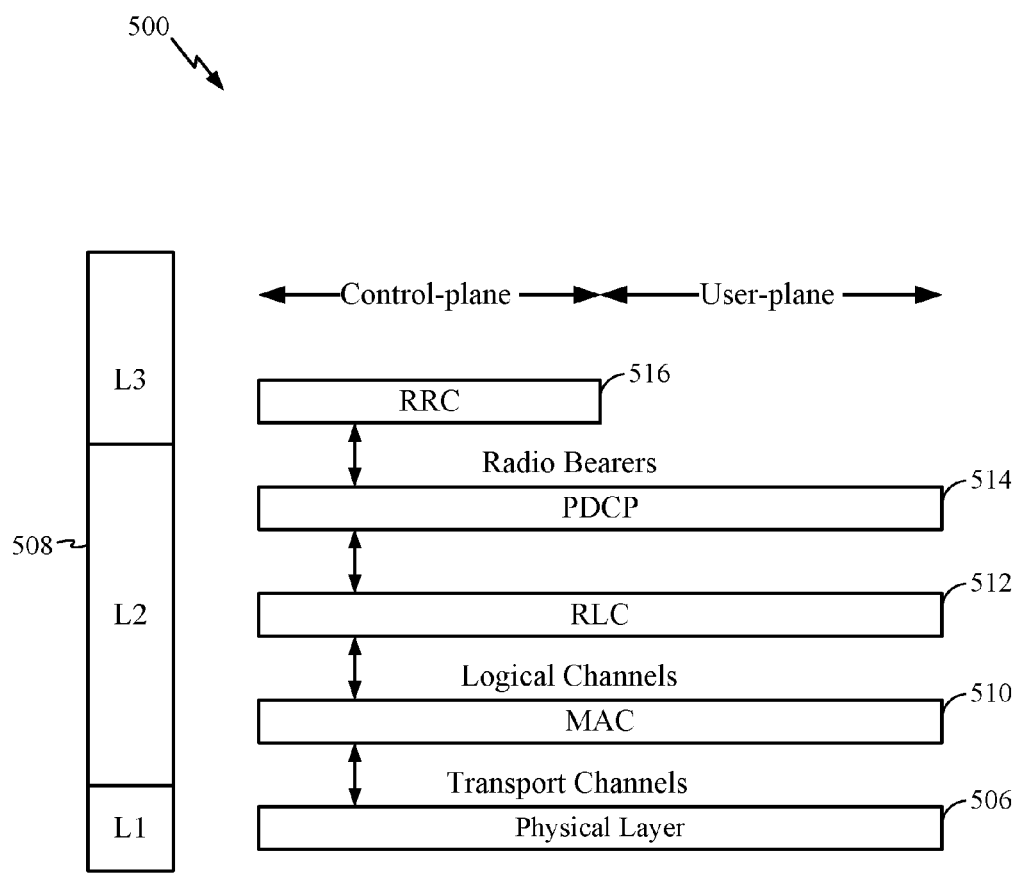
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
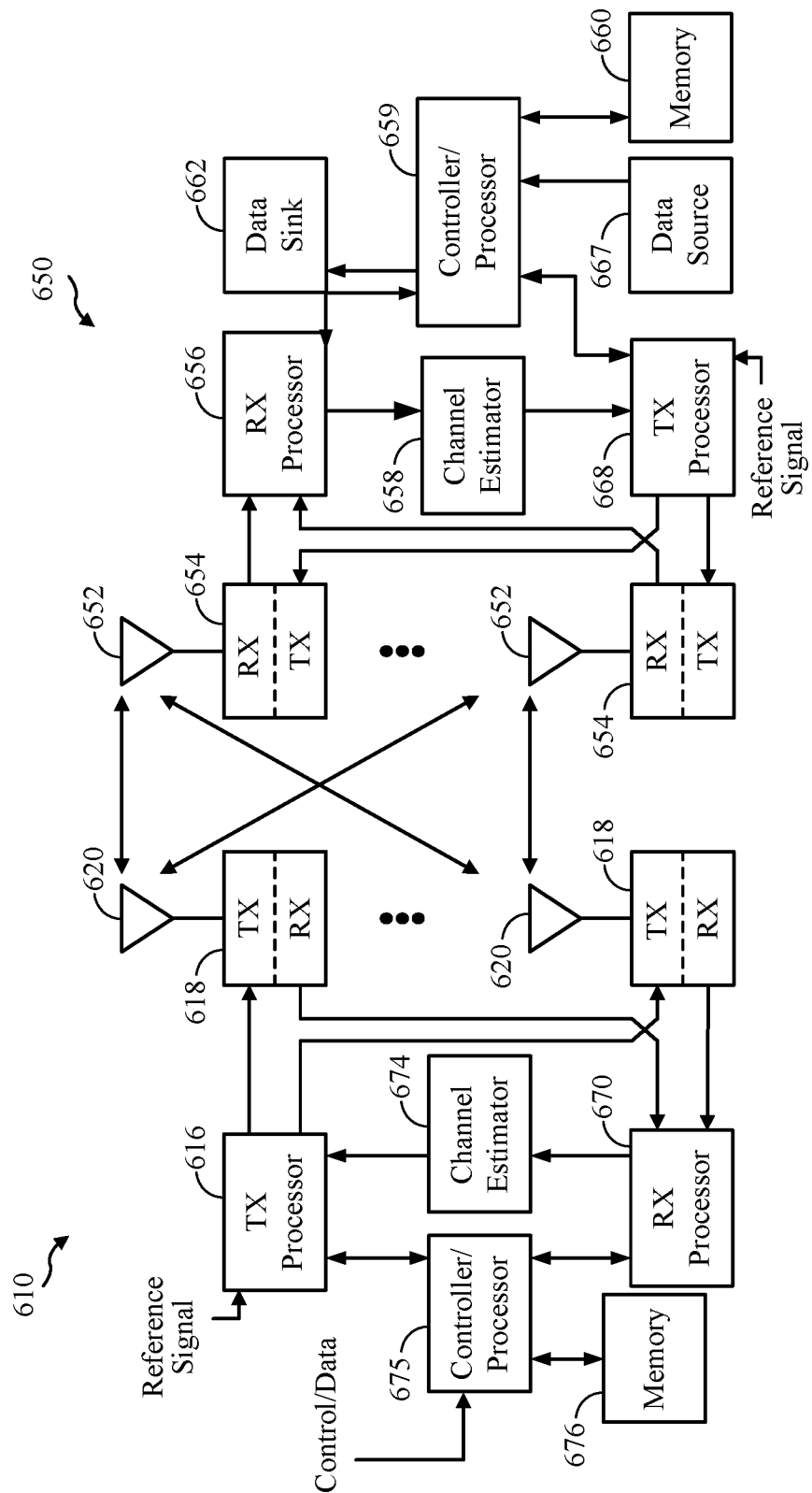
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

The LTE communications standard supports both FDD and TDD frame structures. The transmission timeline for the downlink and uplink may be partitioned into units of radio frames, and each radio frame may be partitioned into 10 subframes with indices of 0 through 9. LTE supports a number of uplink-downlink configurations for TDD. Subframes 0 and 5 are used for the downlink and subframe 2 is used for the uplink for all uplink-downlink configurations. Subframes 3, 4, 7, 8, and 9 may each be used for the downlink or uplink depending on the uplink-downlink configuration. Subframe 1 includes three special fields composed of a Downlink Pilot Time Slot (DwPTS) used for downlink control channels as well as data transmission, a Guard Period (GP) of no transmission, and an Uplink Pilot Time Slot (UpPTS) used for either a random access channel (RACH) or sounding reference signals (SRSs). Subframe 6 may include only the DwPTS, or all three special fields, or a downlink subframe depending on the uplink-downlink configuration. The DwPTS, GP and UpPTS may have different durations for different subframe configurations. For TDD, each subframe used for the downlink may be referred to as a downlink subframe, and each subframe used for the uplink may be referred to as an uplink subframe.

Changes to the implementation of the standards include the possibility of dynamically adapting TDD downlink/uplink (DL/UL) subframe configurations based on the actual traffic needs. If, during a short duration, a large data burst on downlink is needed, a wireless apparatus may change its configuration from, for example, configuration #1 (6 DL; 4 UL) to configuration #5 (9 DL; 1 UL) (See Table illustrated in FIG. 7). If the adaptation is semistatic, the adaptation of TDD configurations is expected to be no slower than 640 ms. If the adaptation is dynamic, in the extreme case, the adaptation may be as fast as 10 ms. Having adjacent cells dynamically switching between different subframe uplink-downlink configurations may cause interference to both downlink and uplink communications when two or more cells have different overlapping downlink and uplink subframes.

Interference Management for Adaptive TDD with Frequency Domain Separations

One aspect of the present disclosure is directed to adapting to downlink/uplink resource allocations. In particular, the downlink/uplink communications may be adjusted according to TDD configurations of serving and neighbor cells.

FIG. 7 illustrates, for LTE TDD systems, different subframe configurations that allow different downlink (DL) to uplink (UL) resource allocations. Compared with FDD systems, where the downlink and uplink resources are equally split, the configurations illustrated in FIG. 7 may provide additional gain when the downlink and uplink load is different. The following description includes adaptive subframe configurations, but those skilled in the art will understand that special subframes are also potentially adaptive.

The TDD configurations may provide adaptation of downlink versus uplink resource allocation according to the cell loading. For example, significant gain has been demonstrated for bursty traffic in single cell evaluations. Additionally, the TDD configurations may reduce transmission overhead when a cell is lightly loaded.

Aspects of the present disclosure are directed to the interference condition for eNode B to eNodeB interference; the interference condition for UE to UE interference; and configuration issues when transitioning from one configuration to another configuration during the transition period.

Interference conditions may include same operator and different operator uses. In particular, for the same operator case, when different configurations are deployed for adjacent cells, then the adjacent cells may experience interference from each other. Additionally, if different operators use different TDD configurations, then in the macro cell boundary region, the TDD configurations may be different. In other cases, when pico cells are deployed in a hot spot, the traffic conditions may be different from the macro cell or another pico cell. Moreover, there can be different TDD configurations between pico to pico cells and pico to macro cells. Also, there may be different configurations for different hotspots. When different carriers are deployed, different TDD configurations can be applied to different carriers. For example, in India, the frequency separation of adjacent carriers can be as small as 2.5 MHz.

Figure 8:
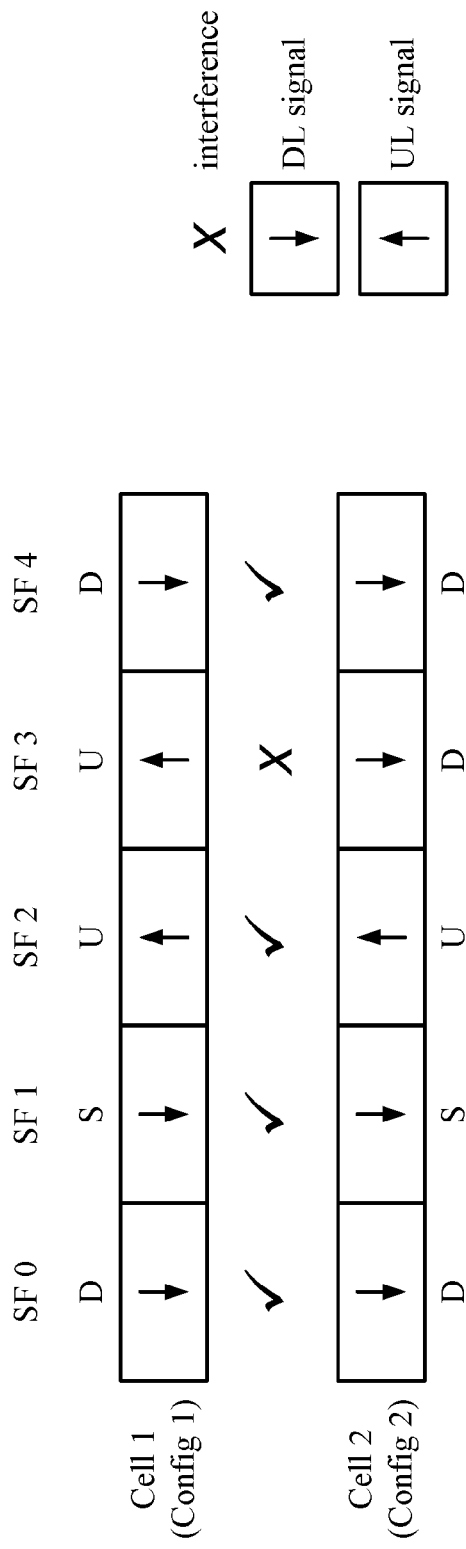
FIG. 8 is a diagram illustrating UE to UE interference and eNodeB to eNodeB interference.
Figure 8:
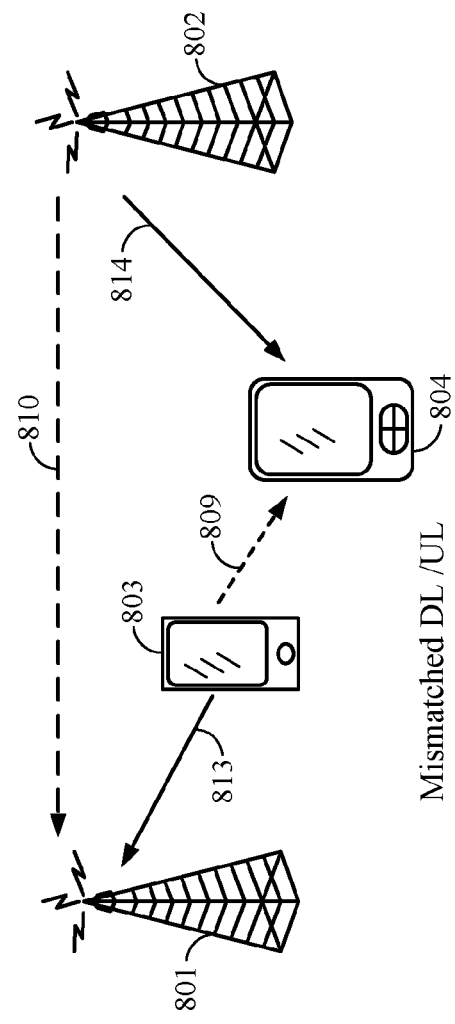

FIG. 8 illustrates a system having base stations (e.g., eNodeBs) 801 and 802. A UE 803 is attempting to communicate with the eNodeB 801 and similarly, a UE 804 is attempting to communicate with the eNodeB 802. The eNodeB 801 is communicating according to configuration 1 and the eNodeB 802 is communicating according to configuration 2. Subframes 0-4 of configurations 1 and 2 are illustrated in FIG. 8. Interference occurs at subframe (SF) 3.

In an example illustration of eNodeB to eNodeB interference, the eNodeB 801 is expecting to receive an uplink signal 813 from the UE 803 while the eNodeB 802 transmits at the same band. As a result, the downlink signal of the eNodeB 802 causes interference 810, thus severely affecting the ability of the eNodeB 801 to receive the expected uplink signal 813. The interference could be large due to the large transmit power of the eNodeB 802.

In an example illustration of UE to UE interference, the UE 804 is expecting a downlink transmission 814 from the eNodeB 804 while the UE 803 is attempting to transmit an uplink signal 813 to the eNodeB 801. The downlink reception of the UE 804 is jammed by the desired uplink transmission 813 of the UE 803 thus causing interference 809. The interference may be large if the UEs are close to each other.

Aspects of the present disclosure are directed to reducing or even minimizing eNodeB to eNodeB interference, reducing or minimizing the UE to UE interferences, frequency domain partitioning, special control channel protection, and carrier aggregation based solutions to reduce/mitigate interference in the adaptive TDD systems.

One aspect of the disclosure is directed to managing frequency domain partitioning for control channels in an adaptive TDD system. The various TDD configurations prioritize protecting the ACK channel and control channel from interference. The data channel can be protected by scheduling data at different subframes to avoid the subframe that has interference. Thus, the data channel is typically better protected than HARQ transmissions. However, more specific considerations are used when managing the protection of the ACK channel because the ACK channel is tied into the data channel with a fixed timing offset.

For the subframes that do not suffer from interference, the control/ACK channel design and partitioning can be flexible. However, for the subframes that are subject to interference, frequency domain partitioning may be applied for additional protection.

Figure 9:
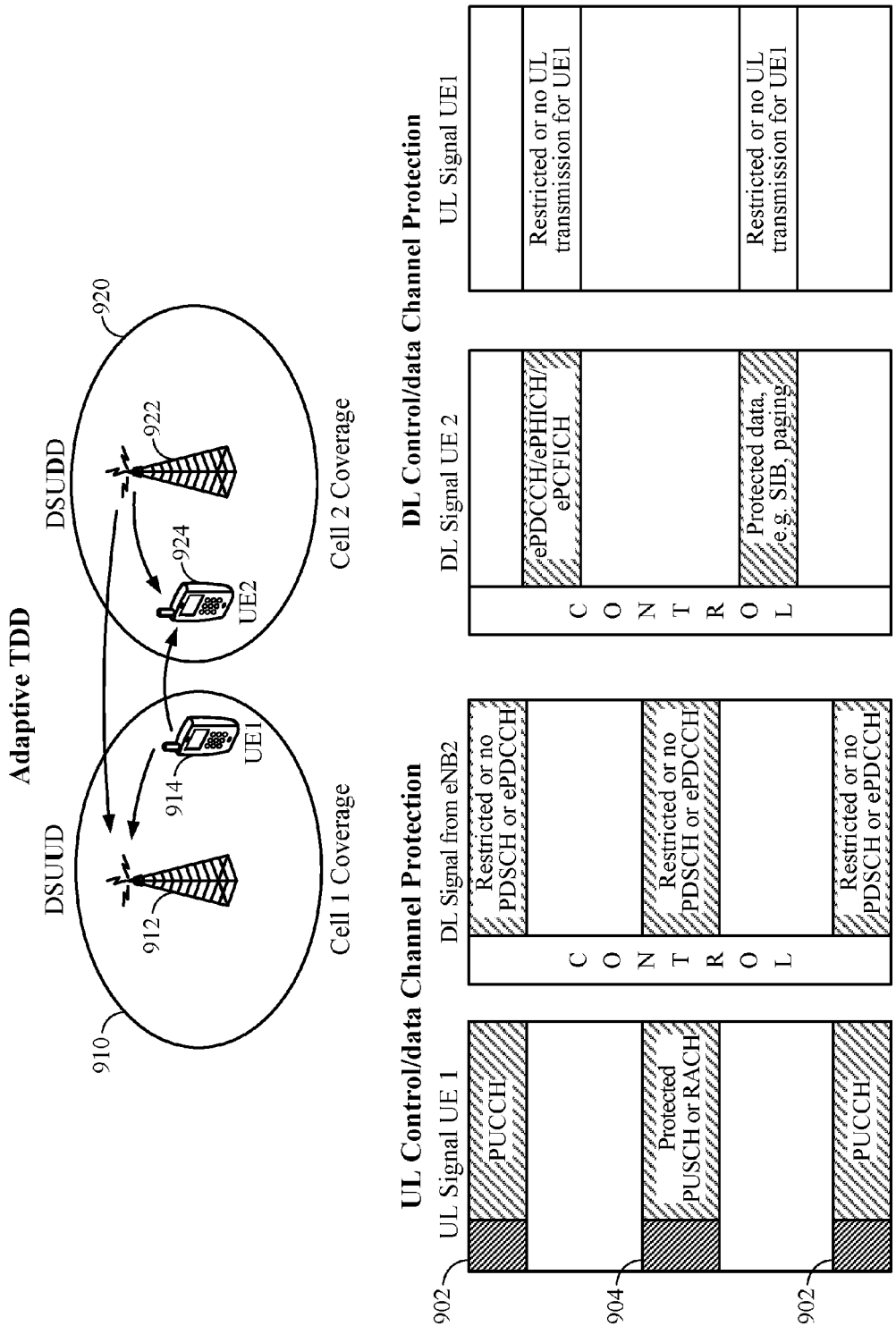
FIG. 9 illustrates examples of uplink and downlink protection.

Referring to FIG. 9, an adaptive TDD system having a cell 910 and a cell 920 is shown. The cell 910 includes a base station 912 (e.g., eNodeB 912) and a UE 914. The cell 920 includes a base station 922 (e.g., eNodeB 922) and a UE 924. The uplink/downlink subframe configuration for the cell 910 is DSUUD (where D corresponds to a downlink subframe and U corresponds to an uplink subframe). The uplink/downlink subframe configuration for the cell 920 is DSUDD. The fourth subframe for the cell 910 is "U" (uplink) and the fourth subframe for cell 920 is "D" (downlink), so the two cells have different uplink and downlink directions at subframe 4.

In one aspect, the downlink channel is blocked (or restricted) to provide protection to the uplink channel. In scenarios where the uplink signal experiences interference from a downlink transmission, the aggressor eNodeB can free some downlink localized resources for the uplink PUCCH region of the adjacent cell. The blank downlink frequency locations from the aggressor eNodeB allow the victim eNodeB to have a protected PUCCH on the uplink.

For example, in cell 910, for the UE uplink signal, the PUCCH is located on the edge tones, and the PUSCH (or RACH) is protected in middle tones. For the eNodeB 922 (of the cell 920) to not jam the PUCCH region, then the PUCCH area of the downlink signal from the eNodeB 922 is blocked (or restricted) which allows the UE 914 uplink signal to transmit without interference (or with reduced interference). In other words, the uplink channel is being protected by restricting the downlink channel transmission.

In another aspect, a downlink channel is protected by blocking the uplink channel. Where the downlink signal of a UE experiences interference from the uplink transmission of another UE, the eNodeB associated with the aggressor UE will vacate some uplink bandwidth for the frequency locations where the ePDCCH is transmitted. The eNode B vacates the uplink bandwidth by not scheduling the aggressor UE.

For example, in the cell 920, to protect the ePDCCH, ePHICH and/or ePCFICH of the downlink signal from the eNodeB 922 to the UE 924, the uplink signal of the UE 914 is not scheduled on the same frequency bands. The blanked (e.g., vacated or restricted) uplink frequency locations from the UE 914 (e.g., the aggressor UE) allow the UE 924 to have a protected ePDCCH (and/or ePHICH and/or EPC-FICH) on the downlink channel In one aspect the downlink/uplink partitioning information is exchanged between eNodeBs via the X2 interface.

In one aspect, the uplink control channel protection is managed by the aggressor eNodeB at the eNodeB level (as opposed to at the UE level). When eNodeB to eNodeB interference occurs, the aggressor eNodeB frees (silences) all frequency resources at the aggressor eNodeB to protect the uplink channel. In another aspect, the eNodeB may implement restricted usage of particular frequency resources with beamforming to different directions or restricted power.

The downlink control channel protection is considered/ managed by the eNodeB at the UE level. That is, for UE to UE interference, only the frequency resources for the aggressor user are vacated. Additionally, the usage may be restricted with low power or if the UE has multiple antennas, usage may be restricted by beamforming into a different direction.

The protection scheme described above can be further applied on data or other channels such as the system information block (SIB) and paging on the downlink and/or other protected channels (e.g. PUSCH or RACH on the uplink).

In another aspect, shortened channels are implemented in the interfered subframes to avoid downlink control region interference. For example, the PUSCH and/or PUCCH can be formatted not to transmit in the beginning of the subframe. This is different from channels that are formatted to not transmit at the end of the subframe (e.g., to accommodate sounding reference signals (SRSs)). For example, in FIG. 9, a region 902 is before the shortened PUCCH. The shortened PUCCH does not transmit in the region 902. The PUSCH/RACH may also be formatted as a shortened channel, having a region 904 at the beginning of the subframe in which no control data is transmitted.

Figure 10:
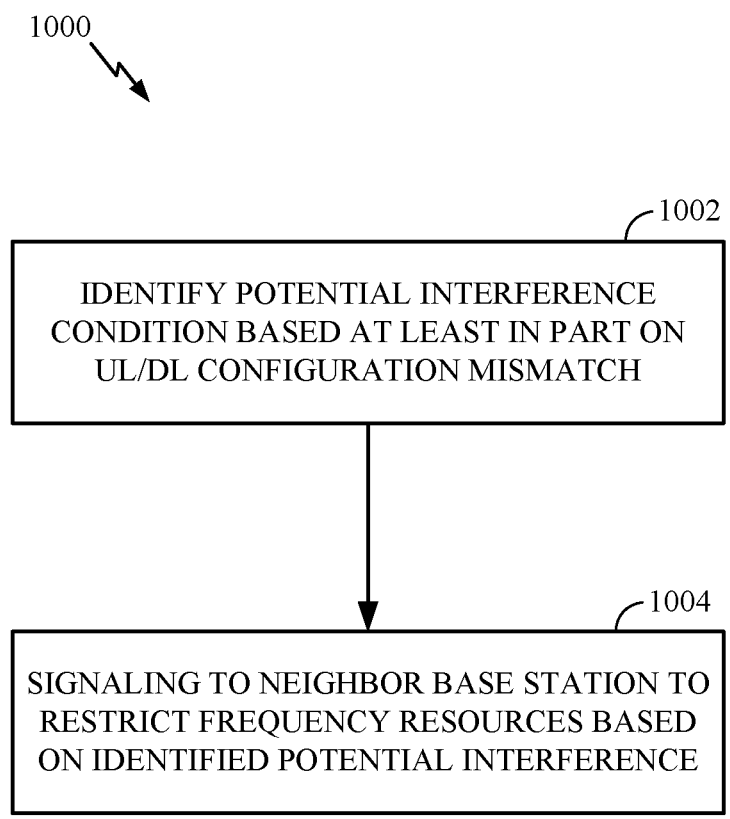
FIG. 10 is a block diagram illustrating a method for managing interference in adaptive TDD with frequency domain separations.

FIG. 10 illustrates a method 1000 for signaling in accordance with identified uplink/downlink configurations. At block 1002, a potential interference condition based at least in part on an uplink/downlink configuration mismatch is identified. The neighbor base station is signaled, in block 1004, to restrict frequency resources based on the identified potential mismatch.

In one configuration, the eNodeB 610 is configured for wireless communication including means for identifying. In one aspect, the identifying means may be the receive processor 670, transmitters/receivers 618, controller/processor 675, antenna 620, and/or memory 676 configured to perform the functions recited by the identifying means. The eNodeB 610 is also configured to include a means for signaling. In one aspect, the signaling means may be the transmit processor 616, transmitters/receivers 618, controller/processor 675, antenna 620, and/or memory 676 configured to perform the functions recited by the signaling means. In another aspect, the aforementioned means may be any module or any apparatus configured to perform the functions recited by the aforementioned means.

Figure 11:
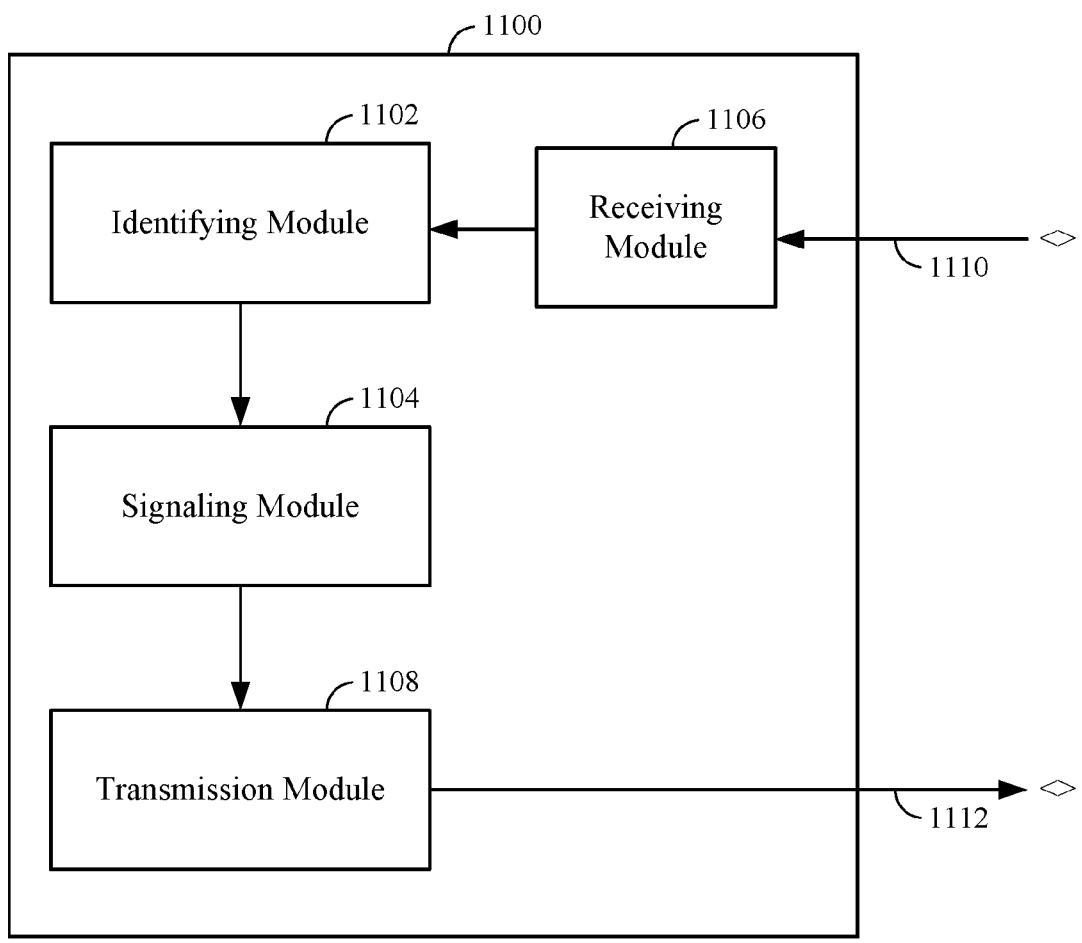
FIG. 11 is a conceptual data flow diagram illustrating the data flow between different modules/means/components in an exemplary apparatus in a system having adaptive TDD with frequency domain separations.

FIG. 11 is a conceptual data flow diagram illustrating the data flow between different modules/means/components in an exemplary apparatus 1100. The apparatus 1100 includes a module 1102 that identifies a potential uplink/downlink configuration mismatch, and a module 1104 that signals in accordance with the identifying. The identifying module 1102 receives signals 1110 from the receiving module 1106 and outputs the potential mismatches to the signaling module 1104. The signaling module 1104 generates signals that are output to the transmission module 1108 for transmitting over the air 1112. The apparatus may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
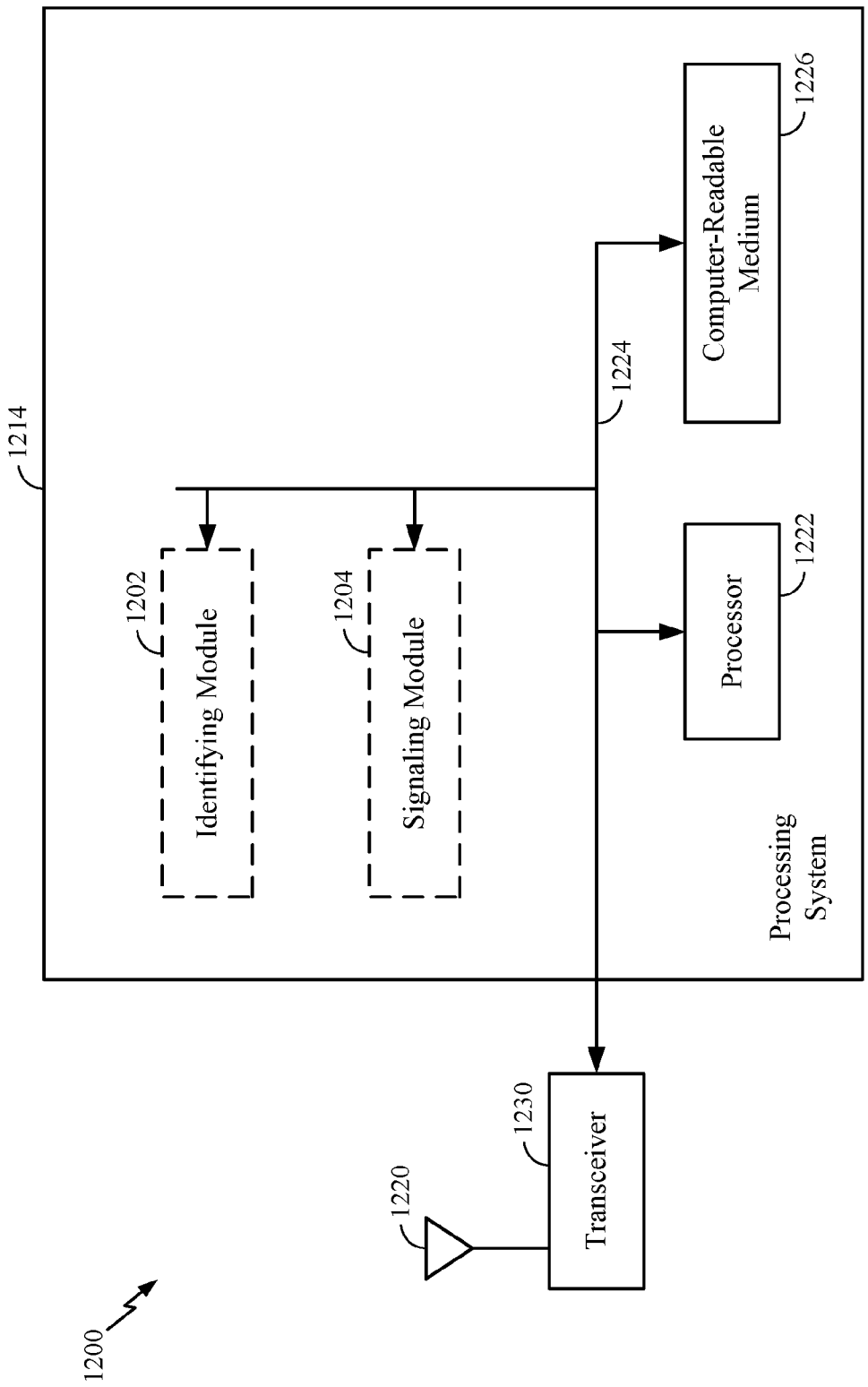
FIG. 12 is a block diagram illustrating exemplary modules/means/components in an exemplary apparatus according to an aspect of the present disclosure.

FIG. 12 is a diagram illustrating an example of a hardware implementation for an apparatus 1200 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1222 the modules 1202, 1204, and the computer-readable medium 1226. The bus 1224 may also link various other circuits such as timing sources, peripherals, voltage regulators, and power management circuits, which are well known in the art, and therefore, will not be described any further.

The apparatus includes a processing system 1214 coupled to a transceiver 1230. The transceiver 1230 is coupled to one or more antennas 1220. The transceiver 1230 enables communicating with various other apparatus over a transmission medium. The processing system 1214 includes a processor 1222 coupled to a computer-readable medium 1226. The processor 1222 is responsible for general processing, including the execution of software stored on the computer-readable medium 1226. The software, when executed by the processor 1222, causes the processing system 1214 to perform the various functions described for any particular apparatus. The computer-readable medium 1226 may also be used for storing data that is manipulated by the processor 1222 when executing software.

The processing system includes an identifying module 1202 and a signaling module 1204. The identifying module 1202 can identify potential uplink/downlink configuration mismatches. The signaling module 1204 can signal based on the identified potential mismatches. The modules may be software modules running in the processor 1222, resident/ stored in the computer-readable medium 1226, one or more hardware modules coupled to the processor 1222, or some combination thereof. The processing system 1214 may be a component of the UE 650 or eNodeB 610.

Carrier Aggregation Related Design Options in Adaptive TDD

Another aspect of the present disclosure is directed to carrier aggregation (CA) related design options in an adaptive TDD system. The carrier aggregation configuration includes multiple carriers for uplink and multiple carriers for downlink. In LTE-systems, Advanced UEs use spectrum in up to 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments conserve spectrum and are a good fit for the typically asymmetric bandwidth utilization by broadband subscribers.

Figure 13:
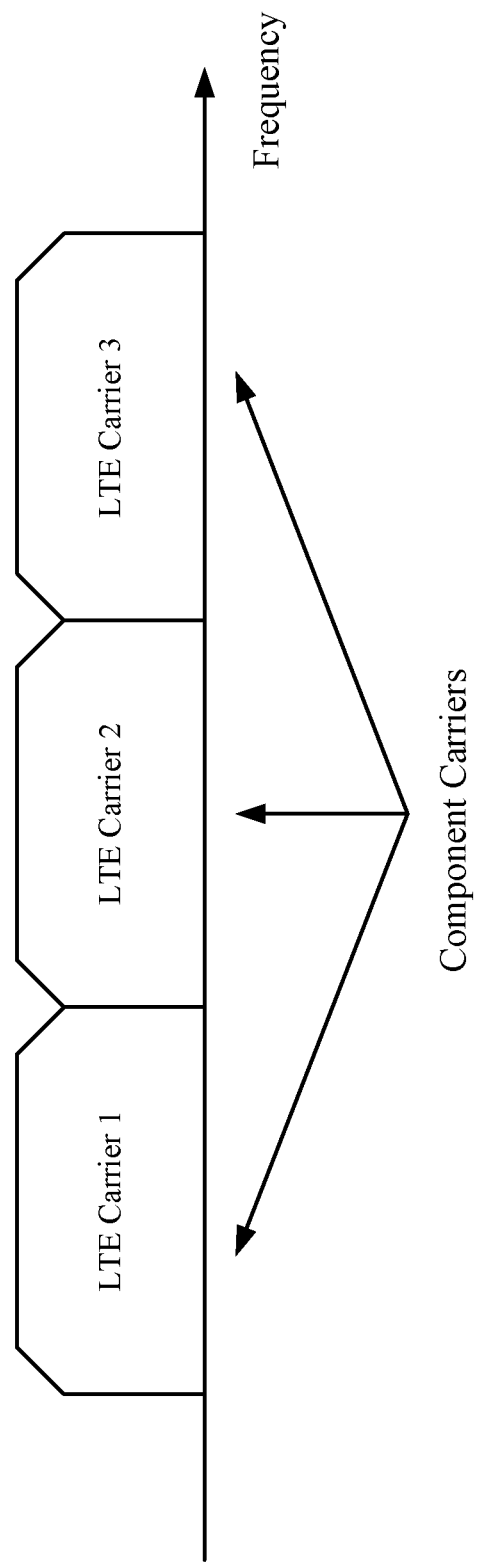
FIG. 13 discloses a continuous carrier aggregation type.
Figure 14:
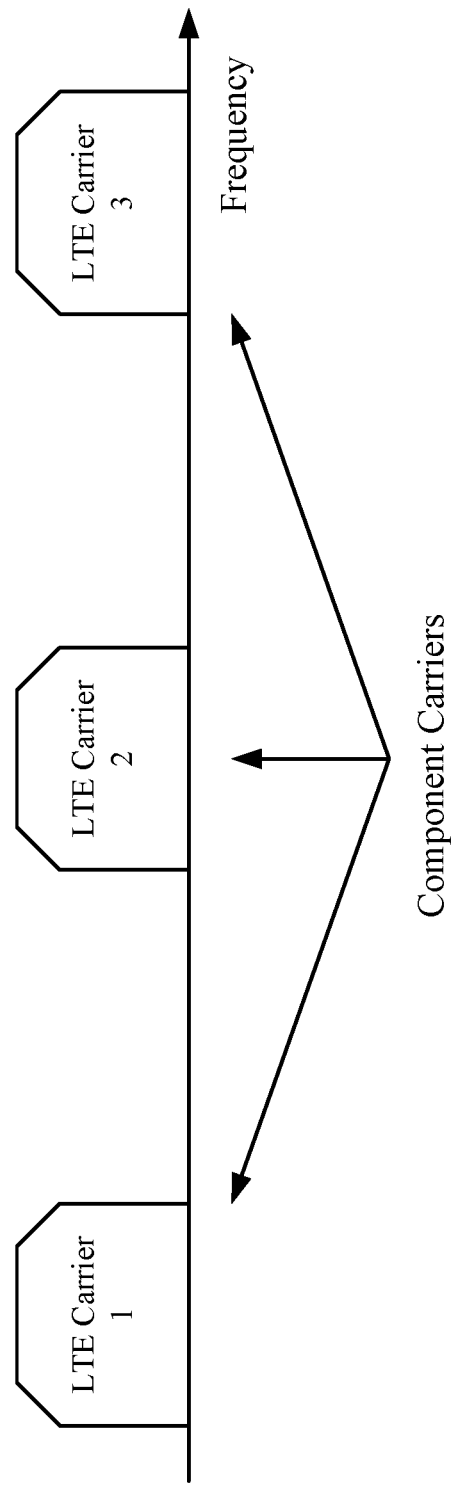
FIG. 14 discloses a non-continuous carrier aggregation type.

LTE-Advanced mobile systems include two types of carrier aggregation (CA) methods, continuous CA and non-continuous CA. They are illustrated in FIGS. 13 and 14. Continuous CA occurs when multiple available component carriers are adjacent to each other (FIG. 13) and non-continuous CA occurs when multiple available component carriers are separated along the frequency band (FIG. 14). Both non-continuous and continuous CA aggregate multiple LTE/component carriers to serve a single unit of LTE Advanced UE.

Multiple radio frequency (RF) receiving units and multiple fast Fourier transforms (FFTs) may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Figure 15:
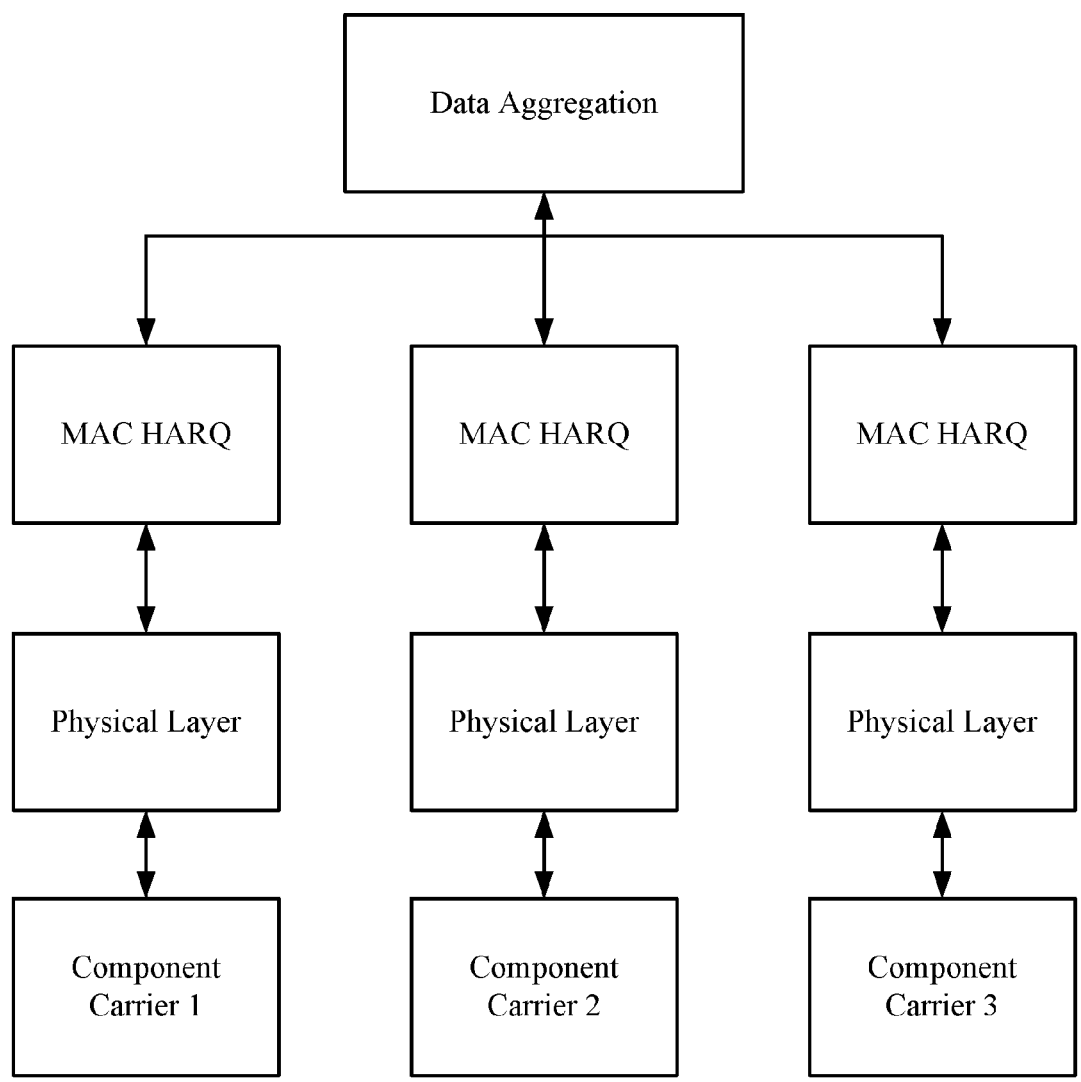
FIG. 15 discloses MAC layer data aggregation.

FIG. 15 illustrates aggregating transmission blocks (TBs) from different component carriers at the medium access control (MAC) layer for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configurations) in the physical layer. Similarly, in the physical layer, one HARQ entity is provided for each component carrier.

In general, there are different approaches for deploying control channel signaling for multiple component carriers. One approach involves a minor modification of the control structure in LTE systems where each component carrier is given its own coded control channel.

Another approach involves jointly coding the control channels of different component carriers and deploying the control channels in a dedicated component carrier. The control information for the multiple component carriers is integrated as the signaling content in this dedicated control channel. As a result, backward compatibility with the control channel structure in LTE systems is maintained, while signaling overhead in the CA is reduced.

In yet another approach, multiple control channels for different component carriers are jointly coded and then transmitted over the entire frequency band. This approach offers low signaling overhead and high decoding performance in control channels, at the expense of high power consumption at the UE side. However, this method is not compatible with LTE systems.

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various examples, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNodeB.

In some examples, there may be multiple primary carriers. In addition, secondary carriers may be added or removed without affecting the basic operation of the UE, including physical channel establishment and radio link failure (RLF) procedures which are layer 2 and layer 3 procedures, such as in the 3GPP technical specification 36.331 for the LTE RRC protocol.

Figure 16:
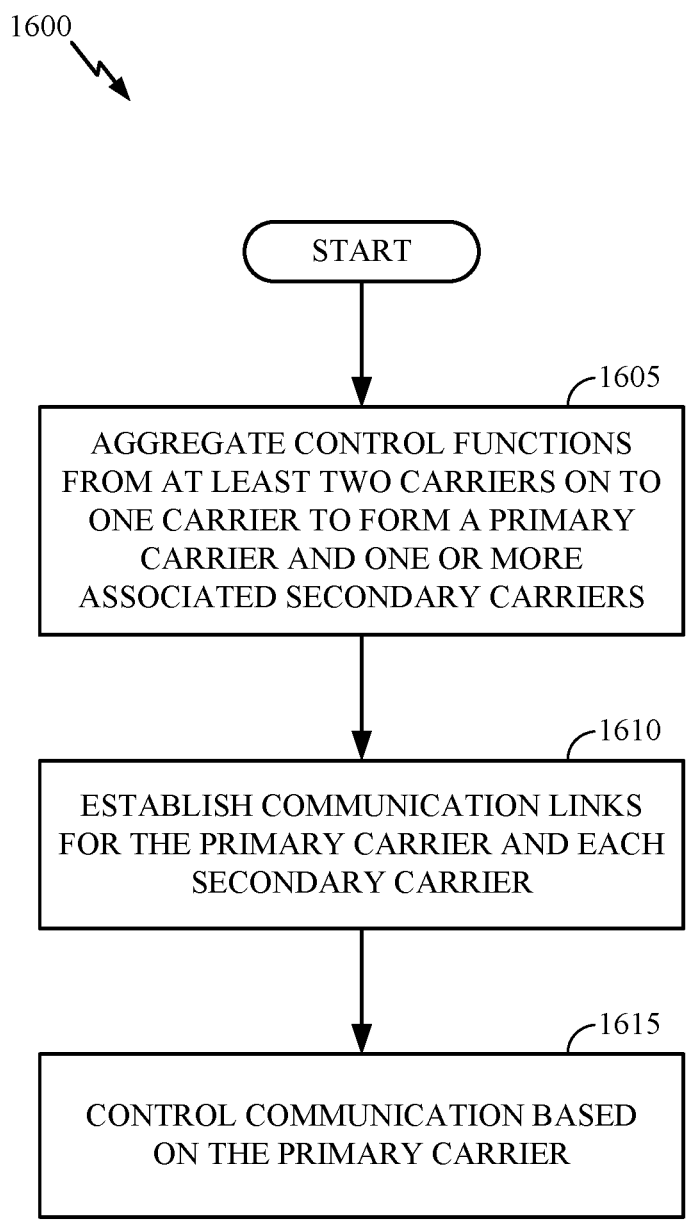
FIG. 16 is a block diagram illustrating a method for controlling radio links in multiple carrier configurations.

FIG. 16 illustrates a method 1600 for controlling radio links in a multiple carrier wireless communication system by grouping physical channels according to one example. As shown, the method includes, at block 1605, aggregating control functions from at least two carriers onto one carrier to form a primary carrier and one or more associated secondary carriers. Next at block 1610, communication links are established for the primary carrier and each secondary carrier. Then, communication is controlled based on the primary carrier in block 1615.

Another aspect of the present disclosure is directed to an adaptive TDD system with carrier aggregation (CA) that includes multiple carriers for uplink and multiple carriers for downlink.

In an FDD system, uplink and downlink signals can be transmitted simultaneously at the same time but in different frequencies. In a TDD system, uplink and downlink signals are transmitted in the same frequency, but at different times. In one aspect of an adaptive TDD system, the uplink and downlink signals may be transmitted at the same time within the same band of the TDD spectrum.

In one aspect of the present disclosure, different downlink and uplink transmissions are allowed within the same carrier in an FDM manner. For example, the PUCCH, PDSCH, EPDCCH and/or PRACH may be multiplexed within the same bandwidth. In one aspect, more defined FDM partition patterns are applied to control interference between uplink/downlink transmissions. The channels can be adaptively switched.

Figures 17A, 17B, 17C:
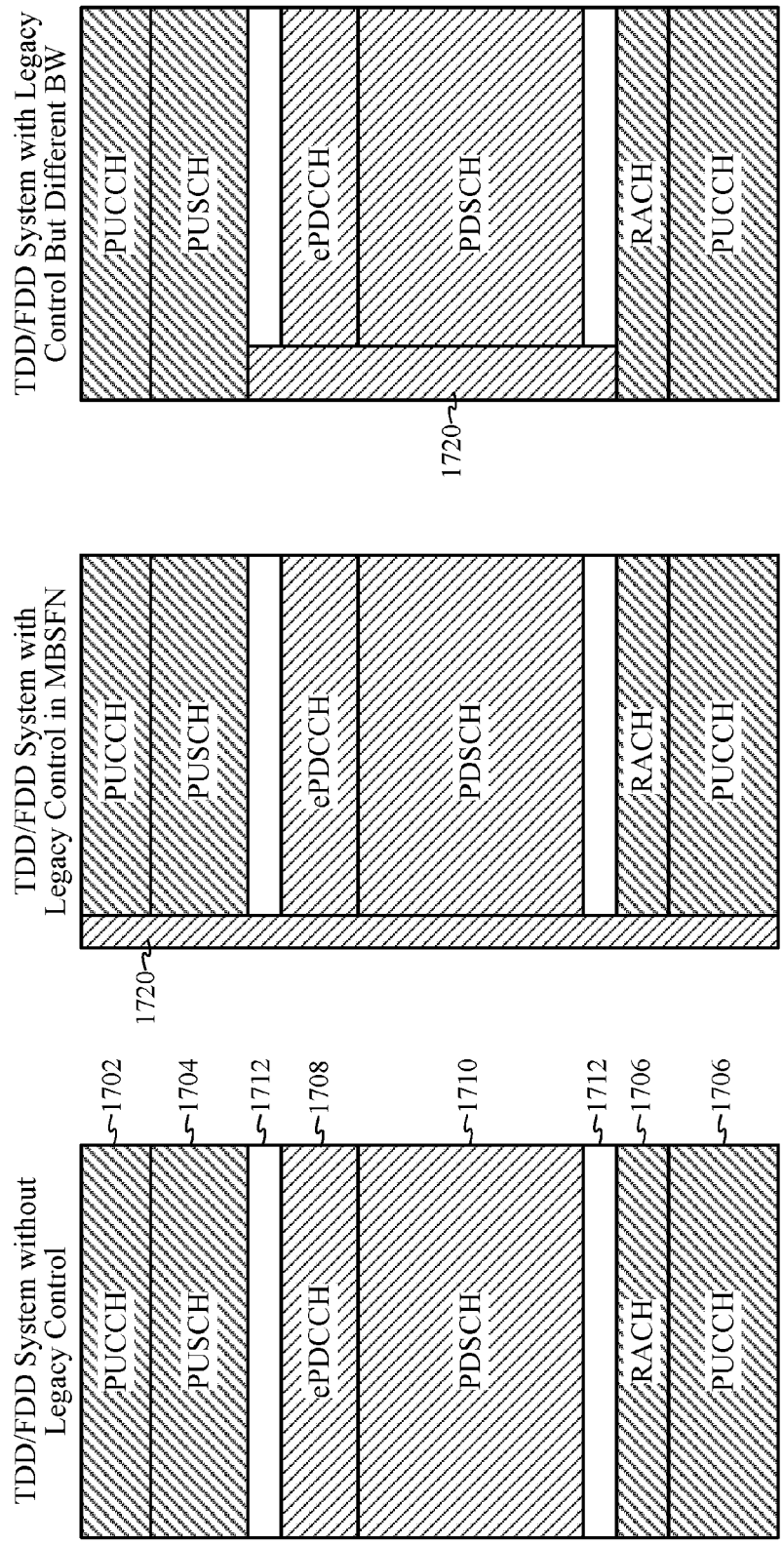
FIGS. 17A-17C are diagrams illustrating various TDD/FDD configurations for a system having a carrier aggregation scheme.

In one aspect, in the same frequency, different regions are allocated for uplink and downlink transmission. FIG. 17A is an example of uplink and downlink transmissions allocated to separate regions in a system without legacy control. In particular, uplink is allocated for transmission in regions

1702, 1704 and 1706. Further, downlink is transmitted in regions 1708 and 1710. Without legacy control channels, the PUCCH and PUSCH are transmitted on the entire edge tones (e.g., regions 1702, 1704) and PDSCH/ePDCCH are transmitted in the middle tones (e.g., regions 1708, 1710). Additionally, guard bands 1712 may be utilized to separate the uplink and downlink transmission.

FIG. 17B illustrates an example of a system including legacy control signaling and reference signals in a region 1720 at the beginning of the uplink/downlink transmissions. In one aspect, the legacy control and the reference signal impact are reduced by using multimedia broadcast over a single frequency network (MBSFN) subframe. A shortened format is utilized for the PUCCH and PUSCH so that the uplink signal does not use the beginning symbols of the subframe (i.e., the region 1720). The ePDCCH and PDSCH are still transmitted in the middle tones, also with a shortened format.

FIG. 17C illustrates a system including legacy control channels in a smaller bandwidth. Accordingly, a different number of symbols are available for uplink and downlink transmission. The uplink signal transmits on the edge tones across all symbols. The downlink signal is restricted to the center of the band with fewer symbols.

In another aspect, different carrier aggregation frequencies may be adaptively applied for downlink and/or uplink transmissions (FDD adaptation). For example, if there are a total of 8 component carriers (CC) in a system, then 5 component carriers may be allocated as downlink component carriers (DL CC) and 3 component carriers may be allocated as uplink component carriers (UL CC) at one time. At another time, 3 component carriers may be allocated for downlink and 5 component carriers for uplink. The TDD adaptation applies to different downlink and uplink configuration changes in time, but the FDD adaptation applies to different component carriers for downlink and uplink transmissions. The TDD adaptation can also be applied on a per component carrier basis.

In another aspect, timing issues may be managed through sounding reference signals (SRSs), timing advance, and new shortened formats in beginning slots for PUSCH and PUCCH.

Figure 18:
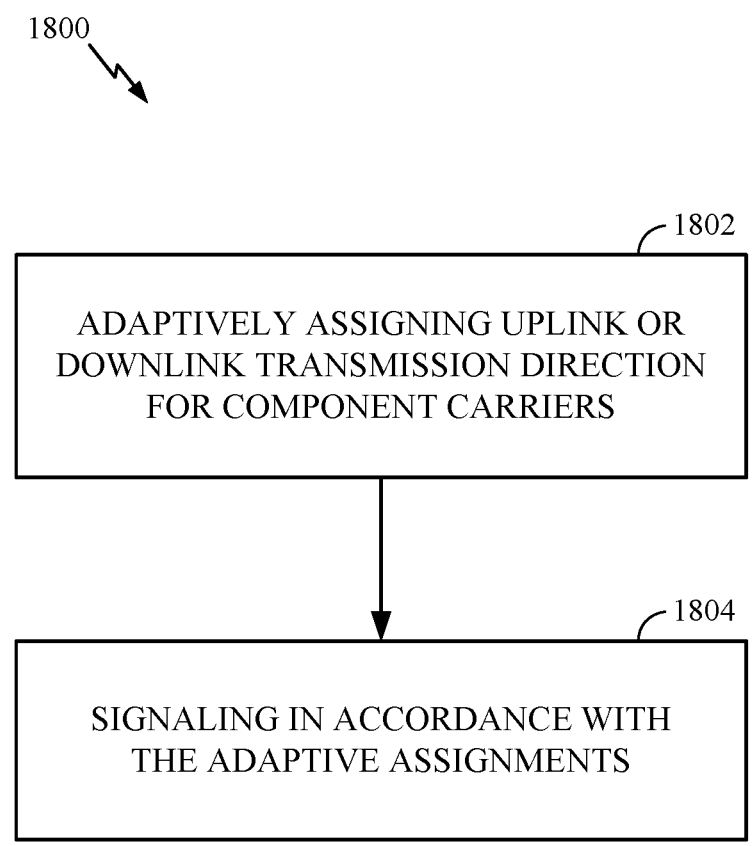
FIG. 18 is a block diagram illustrating a method for signaling in a carrier aggregation configuration according to an aspect of the present disclosure.

FIG. 18 illustrates a method 1800 for signaling in a carrier aggregation configuration. At block 1802, uplink or downlink transmission directions are adaptively assigned for component carriers. At block 1804, signaling in accordance with the adaptive assignments occurs.

In one configuration, the eNodeB 610 is configured for wireless communication including means for adaptively assigning. In one aspect, the adaptively assigning means may be the controller/processor 675, and/or memory 676 configured to perform the functions recited by the adaptively assigning means. The eNodeB 610 is also configured to include a means for signaling. In one aspect, the signaling means may be the transmit processor 616, modulators 618, controller/processor 675, antenna 620, and/or memory 676 configured to perform the functions recited by the signaling means. In another aspect, the aforementioned means may be any module or any apparatus configured to perform the functions recited by the aforementioned means.

Figure 19:
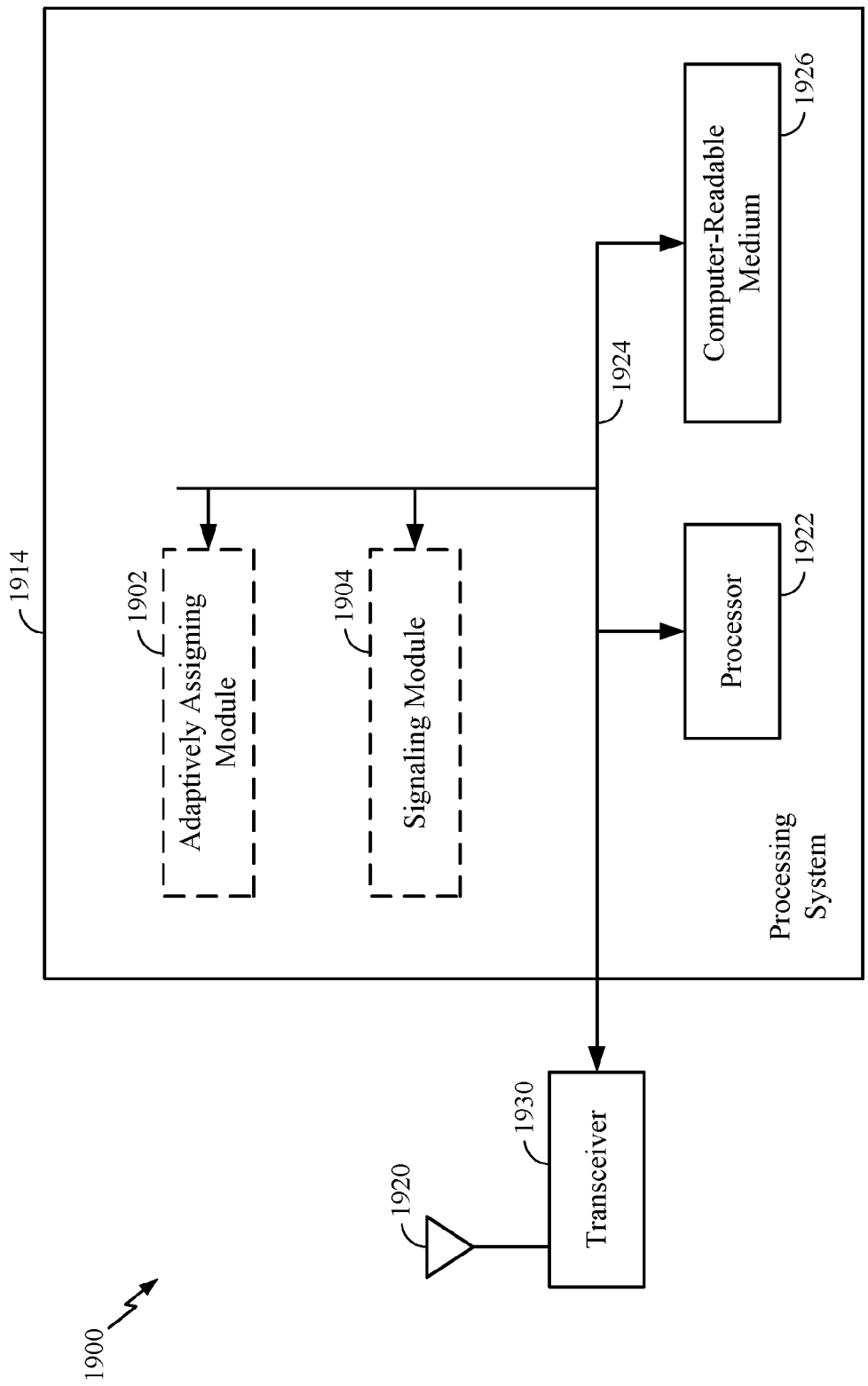
FIG. 19 is a block diagram illustrating exemplary modules/means/components in an exemplary apparatus according to an aspect of the present disclosure.

FIG. 19 is a diagram illustrating an example of a hardware implementation for an apparatus 1900 employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware modules, represented by the processor 1922 the modules 1902, 1904, and the computer-readable medium 1926. The bus 1924 may also link various other circuits such as timing sources, peripherals, voltage regulators, and power management circuits, which are well known in the art, and therefore, will not be described any further.

The apparatus includes a processing system 1914 coupled to a transceiver 1930. The transceiver 1930 is coupled to one or more antennas 1920. The transceiver 1930 enables communicating with various other apparatus over a transmission medium. The processing system 1914 includes a processor 1922 coupled to a computer-readable medium 1926. The processor 1922 is responsible for general processing, including the execution of software stored on the computer-readable medium 1926. The software, when executed by the processor 1922, causes the processing system 1914 to perform the various functions described for any particular apparatus. The computer-readable medium 1926 may also be used for storing data that is manipulated by the processor 1922 when executing software.

The processing system includes an adaptively assigning module 1902 and a signaling module 1904. The adaptively assigning module 1902 can adaptively assign uplink or downlink transmission directions for component carriers. The signaling module 1204 can signal in accordance with the adaptive assignments. The modules may be software modules running in the processor 1922, resident/stored in the computer-readable medium 1926, one or more hardware modules coupled to the processor 1922, or some combination thereof. The processing system 1914 may be a component of the eNodeB 610.

Figure 20:
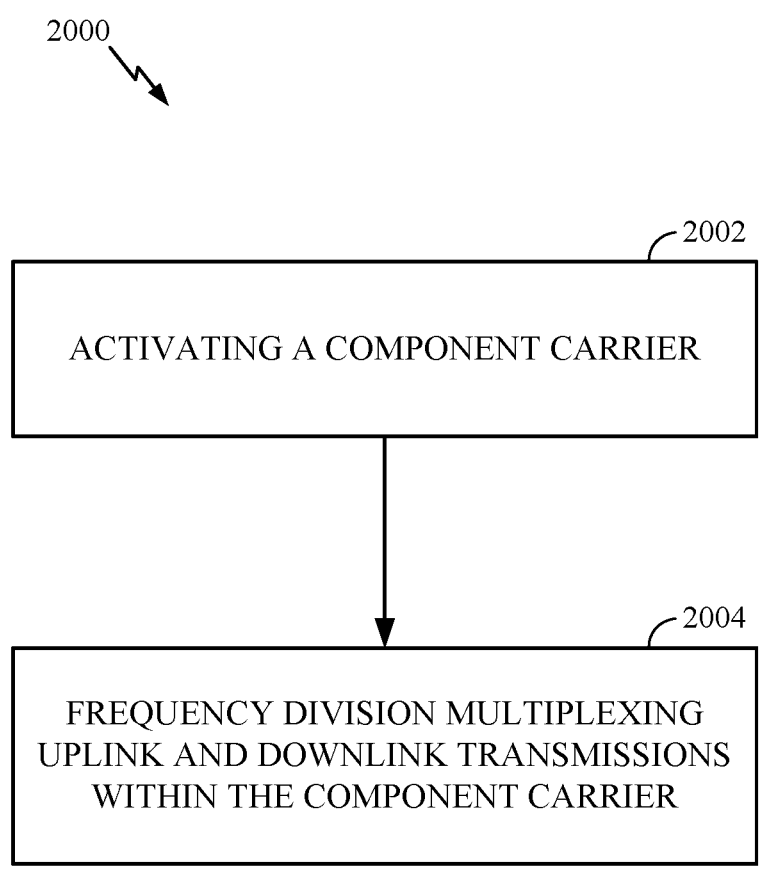
FIG. 20 is a block diagram illustrating a method for signaling in a carrier aggregation configuration according to an aspect of the present disclosure.

FIG. 20 illustrates a method 2000 for signaling in a carrier aggregation configuration. At block 2002, a component carrier is activated. At block 2004, frequency division multiplexing is applied to the uplink and downlink transmissions within the component carrier.

In one configuration, the eNodeB 610 is configured for wireless communication including means for activating. In one aspect, the activating means may be the controller/processor 675, and/or memory 676 configured to perform the functions recited by the activating means. The eNodeB 610 is also configured to include a means for frequency division multiplexing. In one aspect, the frequency division multiplexing means may be the controller/processor 675, and/or memory 676 configured to perform the functions recited by the frequency division multiplexing means. In another aspect, the aforementioned means may be any module or any apparatus configured to perform the functions recited by the aforementioned means.

Figure 21:
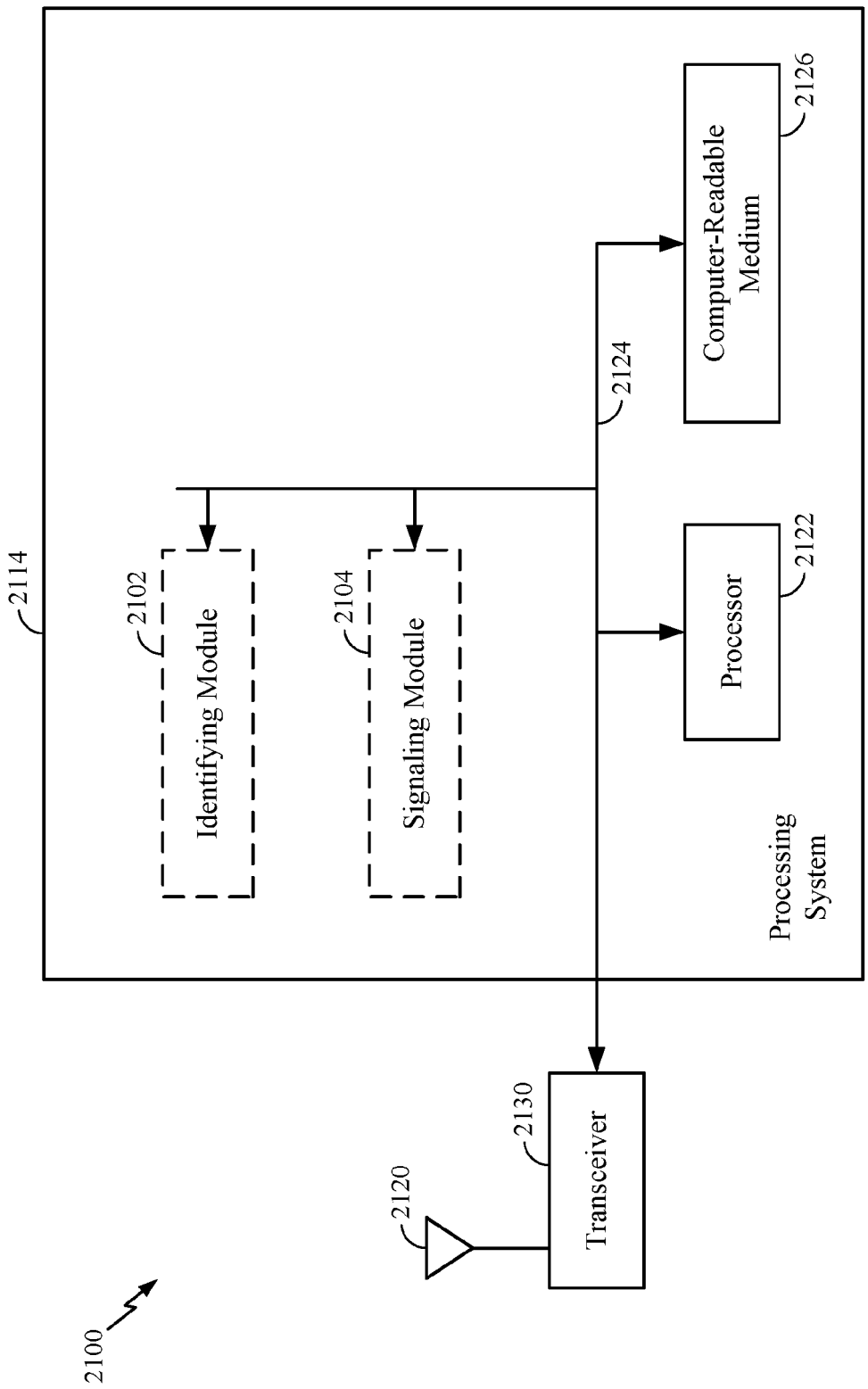
FIG. 21 is a block diagram illustrating exemplary modules/means/components in an exemplary apparatus according to an aspect of the present disclosure.

FIG. 21 is a diagram illustrating an example of a hardware implementation for an apparatus 2100 employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware modules, represented by the processor 2122 the modules 2102, 2104, and the computer-readable medium 2126. The bus 2124 may also link various other circuits such as timing sources, peripherals, voltage regulators, and power management circuits, which are well known in the art, and therefore, will not be described any further.

The apparatus includes a processing system 2114 coupled to a transceiver 2130. The transceiver 2130 is coupled to one or more antennas 2120. The transceiver 2130 enables communicating with various other apparatus over a transmission medium. The processing system 2114 includes a processor 2122 coupled to a computer-readable medium 2126. The processor 2122 is responsible for general processing, including the execution of software stored on the computer-readable medium 2126. The software, when executed by the processor 2122, causes the processing system 2114 to perform the various functions described for any particular apparatus. The computer-readable medium 2126 may also be used for storing data that is manipulated by the processor 2122 when executing software.

The processing system includes an activating module 2102 and a signaling module 2104. The activating module 2102 can activate a component carrier. The frequency division multiplexing module (not shown) can perform frequency division multiplexing for uplink and downlink transmissions within the component carrier. The modules may be software modules running in the processor 2122, resident/stored in the computer-readable medium 2126, one or more hardware modules coupled to the processor 2122, or some combination thereof. The processing system 2114 may be a component of the eNodeB 610.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication within a carrier aggregation configuration, comprising:
   frequency division multiplexing uplink transmissions and downlink transmissions within a component carrier from a plurality of component carriers in a time division duplexed (TDD) network, the uplink transmissions and the downlink transmissions spatially multiplexed so that the uplink transmissions and the downlink transmissions are transmitted on a same carrier and are allocated to different frequency regions of the same carrier, the uplink transmissions allocated to upper edge frequencies and lower edge frequencies, the downlink transmissions allocated to middle frequencies, a guard band allocated between an uplink region and a downlink region, and the downlink transmissions do not use at least a first symbol in a subframe.

2. The method of claim 1, in which the uplink transmissions do not use at least one of a first set of symbols in the subframe.

3. An apparatus for wireless communication, comprising:
a memory; and
at least one processor coupled to the memory, the at least one processor configured:
to frequency division multiplex uplink transmissions and downlink transmissions within a component carrier from a plurality of component carriers in a time division duplexed (TDD) network, the uplink transmissions and the downlink transmissions spatially multiplexed so that the uplink transmissions and the downlink transmissions are transmitted on a same carrier and are allocated to different frequency regions of the same carrier, the uplink transmissions allocated to upper edge frequencies and lower edge frequencies, the downlink transmissions allocated to middle frequencies, a guard band allocated between an uplink region and a downlink region, and the downlink transmissions do not use at least a first symbol in a subframe.

4. The apparatus of claim 3, in which the uplink transmissions do not use at least one of a first set of symbols in the subframe.

5. A non-transitory computer-readable medium having non-transitory program code recorded thereon for wireless communication in a wireless network, the program code comprising:
program code to frequency division multiplex uplink transmissions and downlink transmissions within a component carrier from a plurality of component carriers in a time division duplexed (TDD) network, the uplink transmissions and the downlink transmissions spatially multiplexed so that the uplink transmissions and the downlink transmissions are transmitted on a same carrier and are allocated to different frequency regions of the same carrier, the uplink transmissions allocated to upper edge frequencies and lower edge frequencies, the downlink transmissions allocated to middle frequencies, a guard band allocated between an uplink region and a downlink region, and the downlink transmissions do not use at least a first symbol in a subframe.

6. The non-transitory computer-readable medium of claim 5, in which the uplink transmissions do not use at least one of a first set of symbols in the subframe.

7. An apparatus for wireless communication, comprising:
means for activating a component carrier; and
means for frequency division multiplexing uplink transmissions and downlink transmissions within the component carrier from a plurality of component carriers in a time division duplexed (TDD) network, the uplink transmissions and the downlink transmissions spatially multiplexed so that the uplink transmissions and the downlink transmissions are transmitted on a same carrier and are allocated to different frequency regions of the same carrier, the uplink transmissions allocated to upper edge frequencies and lower edge frequencies, the downlink transmissions allocated to middle frequencies, a guard band allocated between an uplink region and a downlink region, and the downlink transmissions do not use at least a first symbol in a subframe.

8. The apparatus of claim 7, in which the uplink transmissions do not use at least one of a first set of symbols in the subframe.

* * * * *